(12) United States Patent  
Gnahm (10) Patent No.: US 8,656,501 B2  
(45) Date of Patent: Feb. 18, 2014

(54) METHOD AND DEVICE FOR SELECTIVELY PROTECTING ONE OF A PLURALITY OF METHODS OF A CLASS OF AN APPLICATION WRITTEN IN AN OBJECT-ORIENTATED LANGUAGE

(75) Inventor: Benjamin Gnahm, Augsburg (DE)

(73) Assignee: SafeNet Germany GmbH, Germering (DE)

( * ) Notice: Subject to any disclaimer, the term of this patent is extended or adjusted under 35 U.S.C. 154(b) by 91 days.

(21) Appl. No.: 13/174,917

(22) Filed: Jul. 1, 2011

(65) Prior Publication Data

US 2012/0005758 A1    Jan. 5, 2012

(30) Foreign Application Priority Data

Jul. 1, 2010  (EP) .................................... 10168132

(51) Int. Cl.
| | |
|---|---|
| *G06F 21/00* | (2013.01) |
| *G06F 12/14* | (2006.01) |
| *G06F 9/44* | (2006.01) |
| *G06F 12/00* | (2006.01) |
| *G06F 17/30* | (2006.01) |
| *G06Q 99/00* | (2006.01) |
| *H04L 9/00* | (2006.01) |

(52) U.S. Cl.
    USPC ............. 726/26; 713/190; 713/194; 717/100; 707/203

(58) Field of Classification Search
    USPC ..................... 726/26; 713/190, 194; 717/100; 707/203
    See application file for complete search history.

(56) References Cited

U.S. PATENT DOCUMENTS 6,668,325 B1 *  12/2003  Collberg et al. ............... 713/194

(Continued)

FOREIGN PATENT DOCUMENTS

| EP | 1909244 A1 | 4/2008 |
|---|---|---|
| EP | 2009572 A1 * | 12/2008 |

OTHER PUBLICATIONS

Franz, M. ; Amme, W. ; Beers, M. ; Dalton, N. ; Frohlich, P.H. ; Haldar, V. ; Hartmann, A. ; Housel, P.S. ; Reig, F. ; von Ronne, J. ; Stork, C.H. ; Zhenochin, S.; "Making mobile code both safe and efficient"; Foundations of Intrusion Tolerant Systems, Jun. 2003; pp. 337-356.*

(Continued)

*Primary Examiner* — Andrew L Nalven  
*Assistant Examiner* — Courtney Fields  
(74) *Attorney, Agent, or Firm* — Drinker Biddle & Reath LLP (57) ABSTRACT

There is provided a method for selectively protecting one of a plurality of methods of a class of an application written in an object-orientated language, in particular Java, wherein a protected application is created by adding a protection module to the application, analyzing a first method to be protected of a plurality of methods of a first class of the application and determining first parameters needed for executing the first method, generating first gate code depending on the determined first parameters, replacing the first code of the first method by said first gate code and storing the replaced first code such that it can be accessed by the protection module during execution of the protected application, wherein, when the first method is called during execution of the protected application, the first gate code collects first data based on the determined first parameters and transmits the collected first data to the protection module, the protection module accesses the stored first code and generates a new class including a first substitution method based on the stored first code, instantiates the new class, invokes the first substitution method and passes at least a part of the collected first data to the invoked first substitution method so that the executed first substitution method provides the functionality of the first method, and returns execution to the first gate code after execution of the first substitution method.

12 Claims, 4 Drawing Sheets

(56) References Cited

U.S. PATENT DOCUMENTS

| | | |
|---|---|---|
| 2004/0006765 A1 | 1/2004 | Goldman |
| 2006/0123067 A1* | 6/2006 | Ghattu et al. ................. 707/203 |
| 2007/0143630 A1 | 6/2007 | Zunke |
| 2009/0172631 A1* | 7/2009 | Zunke et al. .................. 717/100 |
| 2012/0246487 A1* | 9/2012 | Gu et al. ....................... 713/190 |

OTHER PUBLICATIONS

Yang, Li, "Add dynamic Java code to your application", Dec. 6, 2006, Retrieved from the Internet: URL:http://www.javaworld.com/javaworld/jw-06-2006/jw-0612-dynamic.html [retrieved on Sep. 20, 2010].

* cited by examiner

METHOD AND DEVICE FOR SELECTIVELY PROTECTING ONE OF A PLURALITY OF METHODS OF A CLASS OF AN APPLICATION WRITTEN IN AN OBJECT-ORIENTATED LANGUAGE

The present invention relates to a method and a device from selectively protecting one of a plurality of methods of a class of an application written in an object-orientated language, in particular Java.

There is a need for selectively protecting one of a plurality of methods of a class of an application written in an object-orientated language since in this way the software vendor and/or the software creator can easily license single feature of an application. In particular, it is often desired to protect single methods from static code analysis without reducing the performance of the application in a undue manner.

When the application is written in Java there exists the drawback that it is not possible to amend methods of a class during runtime. Therefore, it is not possible to provide a class to be protected in encrypted form in the application since the necessary decryption during runtime would be a change of the class during runtime which is not allowed by the Java runtime environment.

In view thereof it is object of the invention to provide a method and a device for selectively protecting one of a plurality of methods of a class of an application written in an object-orientated language, in particular in Java.

The object is solved by a method for selectively protecting one of a plurality of methods of a class of an application written in an object-orientated language, in particular Java, wherein a protected application is created by adding a protection module to the application, analyzing a first method to be protected of a plurality of methods of a first class of the application and determining first parameters needed for executing the first method, generating first gate code depending on the determined first parameters, replacing the first code of the first method by said first gate code and storing the replaced first code such that it can be accessed by the protection module during execution of the protected application, wherein, when the first method is called during execution of the protected application, the first gate code collects first data based on the determined first parameters and transmits the collected first data to the protection module, the protection module accesses the stored first code and generates a new class including a first substitution method based on the stored first code, instantiates the new class, invokes the first substitution method and passes at least a part of the collected first data to the invoked first substitution method so that the executed first substitution method provides the functionality of the first method, and returns execution to the first gate code after execution of the first substitution method.

Since the new class (including the first substitution code) is generated and instantiated during execution of the protected application any step necessary for the protection (e.g. a step of decrypting the first code which can be stored in encrypted form) can be carried out during runtime. Therefore, it does not matter whether the runtime environment allows or does not allow amendments of a method of an already existing class during runtime since no amendment of a method of an already existing class is necessary during runtime. Therefore, the protected application can be a Java application.

The first code can be stored such that it is only accessible by the protection module during runtime (for example by storing in a proprietary container file). In this way a good protection is achieved. This kind of storing the first code can be used for avoiding static code analysis and/or for licensing. The protected application can be licensed as an on-premise software application or as a software as a service application (SaaS) provided via a distributed computer system (as for example the internet).

In particular, the inventive method is a computer implemented method.

The step of storing the replaced first code can be carried out such that the replaced first code is stored in encrypted form. This leads to a good protection since the encrypted code can not be used and can not be understood by a cracker.

Further, a symbol obfuscation and/or a code obfuscation of the replaced first code can be carried out before storing it. This enhances the protection.

The first data can include a first method identifier identifying the first protected method. The method identifier can be used by the protection module for accessing the stored first code.

Further, by providing a method identifier in the first data (e.g. when the first gate code collects the first data) it is possible to selectively protect more than one method (of one or more classes) since the respective protected class can be easily identified by the protection module during runtime of the protected application by using the method identifier. In addition, the first data can include an instance identifier identifying the instance of the first method called during execution, wherein a data region is assigned to that instance (normally by the runtime environment), and the first substitution method is generated such that the first substitution method uses the assigned data region (when the first substitution method is invoked).

In particular, the first substitution method includes additional code which redirects the pointer of the instance of the invoked first substitution method to the assigned data region of the instance of the first method called during execution.

The protection module can carry out code obfuscation and/or symbol obfuscation when generating the new class.

The first gate code and the code of the first substitution method can be generated such that they are executed in the same runtime environment. However, it is also possible, that the first gate code and the code of the first substitution method are generated such that they are executed in different runtime environments. In this case, it is preferred that the code of the protection module is also executed in the (second) runtime environment for the first substitution method. However, it is possible that the code of the protection module is executed in the (first) runtime environment of the first gate code or that a part of the code of the protection module is executed in the second runtime environment and that another part of the code of the protection module is executed in the first runtime environment. In this way the protection can be efficiently enhanced.

It is preferred that the second runtime environment understands a different code syntax than the first runtime environment. In this case a necessary code transformation has to be carried out for the code to be executed in the second runtime environment which leads to an enhanced protection.

The runtime environment for the first gate code can be the runtime environment for the application to be protected, for example the Java runtime environment. The second runtime environment can be proprietary runtime environment not publicly known. In this way a very good protection can be realized.

Before storing the replaced first code it can be adapted in view of the first substitution method to be generated during runtime.

The step of replacing can include setting the visibility of the first class to public (static visibility setting).

Further, it is possible that the executed first substitution method dynamically changes the visibility of the first class during execution (dynamic visibility setting).

In addition, the static visibility setting and the dynamic visibility setting can be combined, if possible and desired.

In a further embodiment the first code can be amended before storing such that the executed first substitution method (the new class including the first substitution method is generated based on the stored first code) provides an additional functionality. The additional functionality is a further functionality with respect of the functionality of the first method provided by the executed first substitution method.

It is possible that the generated new class solely includes one single method, namely the first substitution method.

The protection module can cache the code of the generated new class when it returns the execution to the first gate code. In this case, there is no need for generating the new class again when the first method is called again during execution (the cached code can be used). This leads to an accelerated execution during runtime.

However, in an alternative embodiment, the protection module can discard or clear the code of the generated new class when it returns the execution to the first gate code. When the first method is called again during execution, the new class has to be generated again. This leads to an enhanced protection since the time duration is reduced during which the code of the generated new class is in principle accessible for a cracker.

Further, the generation of the protected application can include the steps of: analyzing a second method to be protected of the first class or of a second class of the application and determining second parameters needed for execution of the second method, generating second gate code depending on the determined second parameters, replacing the second code of the second method by said second gate code and storing the replaced second code such that it can be accessed (preferably such that it can be only accessed) by the protection module during execution of the protected application, wherein, when the second method is called during execution of the protected application, the second gate code collects second data based on the determined second parameters and transmits the collected second data to the protection module, the protection module accesses the stored second code and generates a second new class including a second substitution method based on the stored second code, instantiates the second new class, invokes the second substitution method and passes at least a part of the collected second data to the invoked second substitution method so that the executed second substitution method provides the functionality of the second method, and returns execution to the second gate code after execution of the second substitution method.

In this way, a plurality of methods can be selectively protected. In particular it is possible to carry out corresponding steps for protecting further methods.

It is possible to use different protection modules for methods of different classes, in particular one protection module for each class.

Further embodiments with respect to the second method or with respect to further methods to be protected can be realized in a corresponding manner as further embodiments for the first method.

There is further provided a computer program product which comprises software code in order to carry out the steps for generating the protected application according to the inventive method as well as according to the further embodiments of the inventive method when the product is being executed on a computer.

There is further provided a device for selectively protecting one of the plurality of methods of a class of an application written in an object-orientated language, in particular Java, wherein the device generates a protected application by adding a protection module to the application, analyzing a first method to be protected of a plurality of methods of a first class of the application and determining first parameters needed for executing the first method, generating first gate code depending on the determined first parameters, replacing the first code of the first method by said first gate code and storing the replaced first code such that it can be accessed (preferably such that it can be only accessed) by the protection module during execution of the protected application, wherein, when the first method is called during execution of the protected application, the first gate code collects first data based on the determined first parameters and transmits the collected first data to the protection module, the protection module accesses the stored first code and generates a new class including a first substitution method based on the stored first code, instantiates the new class, invokes the first substitution method and passes at least a part of the collected first data to the invoked first substitution method so that the executed first substitution method provides the functionality of the first method, and the protection module returns execution to the first gate code after execution of the first substitution method.

Further embodiments of the inventive device can be realized in the same way as described above with respect to the inventive method (including all further embodiments of the inventive method).

It will be appreciated that the features mentioned above and those yet to be explained below can be used not only in the indicated combinations but also in other combinations or alone, without departing from the scope of the present invention.

The invention will be explained below in closer detail by reference to the enclosed drawings which also disclose features relevant to the invention, wherein.

Figure 1:
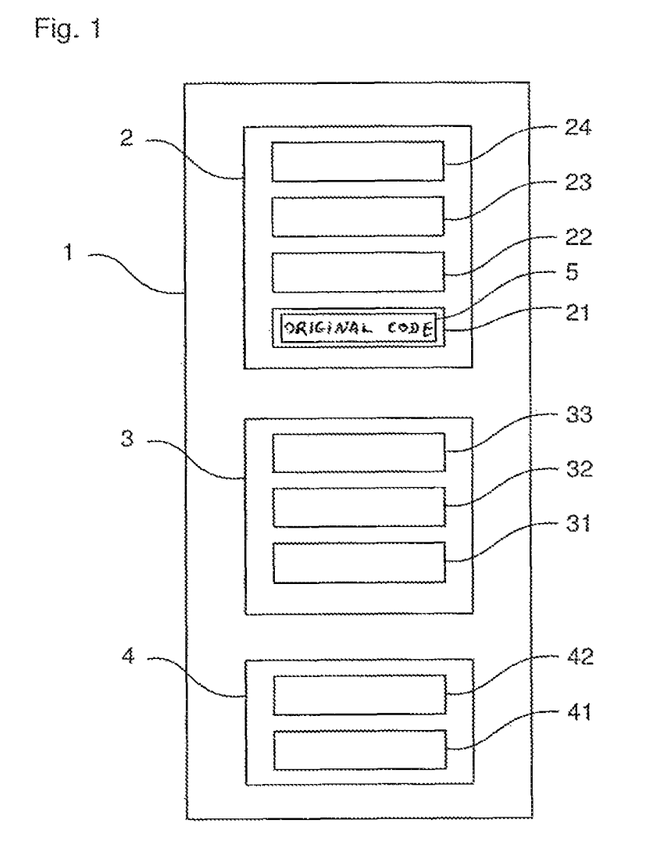
FIG. 1 schematically shows the binary code container of an application written in Java.

FIG. 1 schematically shows the binary code container file of an application 1 written in Java and comprising three classes 2, 3, 4 each including a plurality of different methods 21, 22, 23, 24, 31, 32, 33.

For explanation purposes, it is assumed that the first class 2 is the class "car" representing the properties of a car which can be configured on a website of a car manufacturer. It is further assumed that the original code 5 of the first method 21 of the first class 2 includes the function getcolour (type). When executing the application 1, the method getcolour (type) determines the colour of the requested type (possible type values are: left door, right door, front bumper, rear bumper, etc.).

Figure 2:
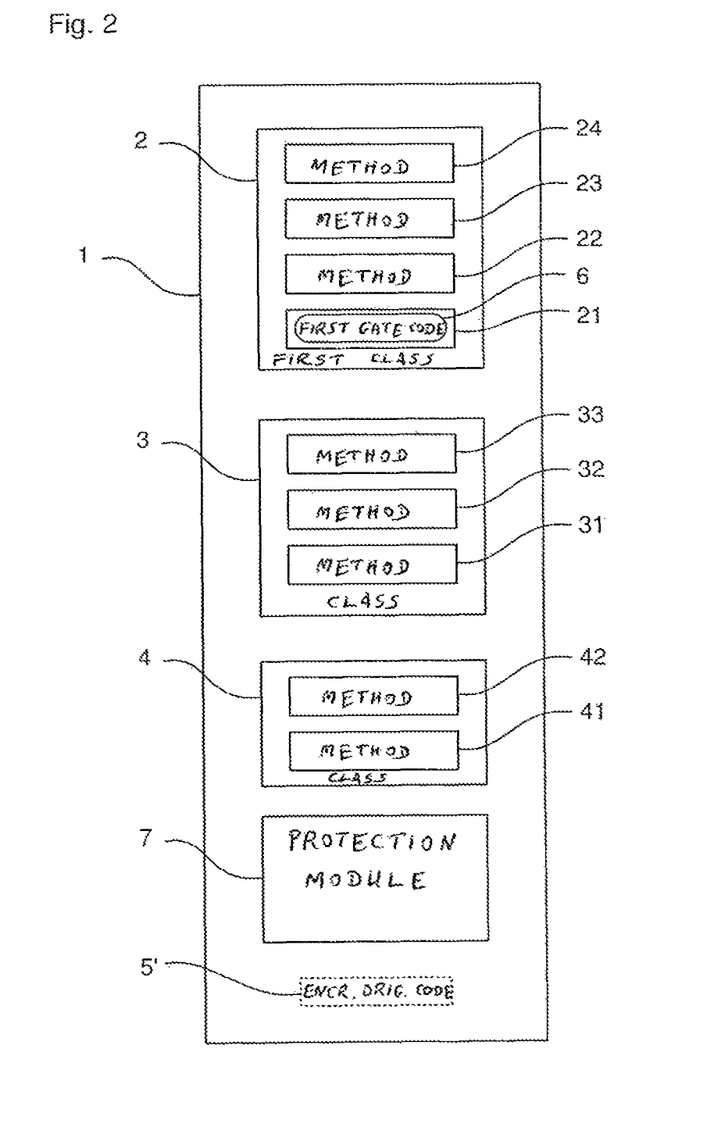
FIG. 2 schematically shows the binary code container of a protected application written in Java.
Figure 3:
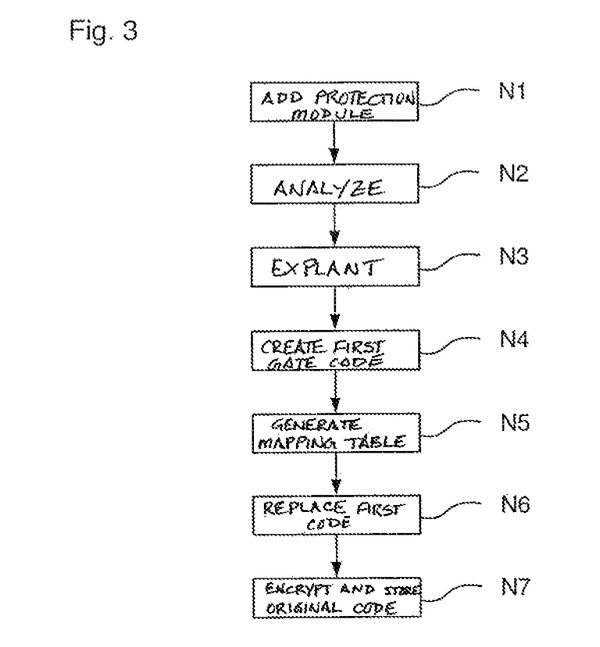
FIG. 3 schematically shows the steps for generating the protected application shown in FIG. 2.

In order to selectively protect the first method 21 of the first class 2, the following steps are carried out:

A protection module 7 is added to the application 1 (FIG. 2) in step N1 (FIG. 3).

Thereafter, the first method 21 to be protected is analyzed as to the parameters needed for execution (step N2). In the present example the value of the parameter type for the function getcolour (type) is needed. Further examples for parameters needed are code attributes, StackMapTable attributes and exception attributes.

The original code 5 (first code 5) of the first method 21 is explanted from the application 1 (step N3).

In step N4 first gate code 6 is created taking into consideration the information from the analyzing step N2. As will be explained in more detail below, the first gate code 6 will collect data based on the determined parameters and transmit the collected data to the protection module 7 during execution and will carry out the handling when the execution returns from the protection module 7.

In the following step N5, a method mapping table is generated for later use. The method mapping table is used when more than one method is protected. In this case the method mapping table is used to assign an unique method identifier to each method to be protected.

In step N6 the first code 5 in the binary container file (as schematically shown in FIG. 2) is replaced by the first gate code 6. In addition, it is possible to set the visibility of the first class 2 to public in step N6.

Further, the explanted original code 5 is encrypted and stored in encrypted form 5' in the container file of the application (step N7) so that an amended application 1' is generated (FIG. 2). Of course it is possible to store the encrypted original code 5' outside the container file of the protected application 1'. However, the encrypted original code 5' is still part of the protected application 1'.

In addition the mapping table is stored in encrypted form in step N7.

In this way, the protected application 1' includes the protected method 21 so that a static code analysis of the first method is prevented.

Before encrypting the code in step N7 it is possible to carry out a code obfuscation and/or a symbol obfuscation. Code obfuscation can be realized by inserting dead code and junk instructions. Further, the execution flow can be changed by adding circular jumps. The symbol obfuscation can be realized by changing the original name of fields of the first method 21 and/or by changing the original name of the first method 21 itself. In particular, the names can be replaced by random strings.

The above-mentioned steps N1 to N7 can be carried out in the mentioned order to generate the protected application 1'. Of course it is possible to carry out the steps N1 to N7 in other orders. For example, the order of steps N1 and N2 can be changed.

Figure 4:
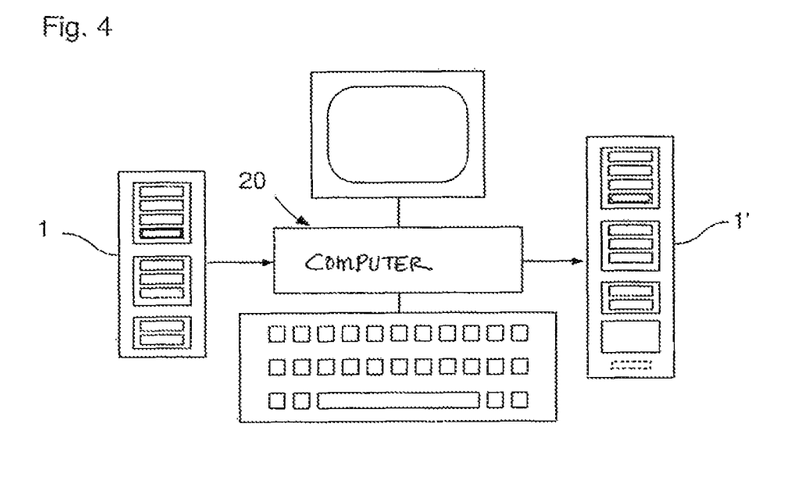
FIG. 4 schematically shows a device for carrying out the steps shown in FIG. 3.

The steps N1-N7 can be carried out by a computer 20 as schematically shown in FIG. 4. As a result, the computer 20 generates the protected application 1'.

Figure 5:
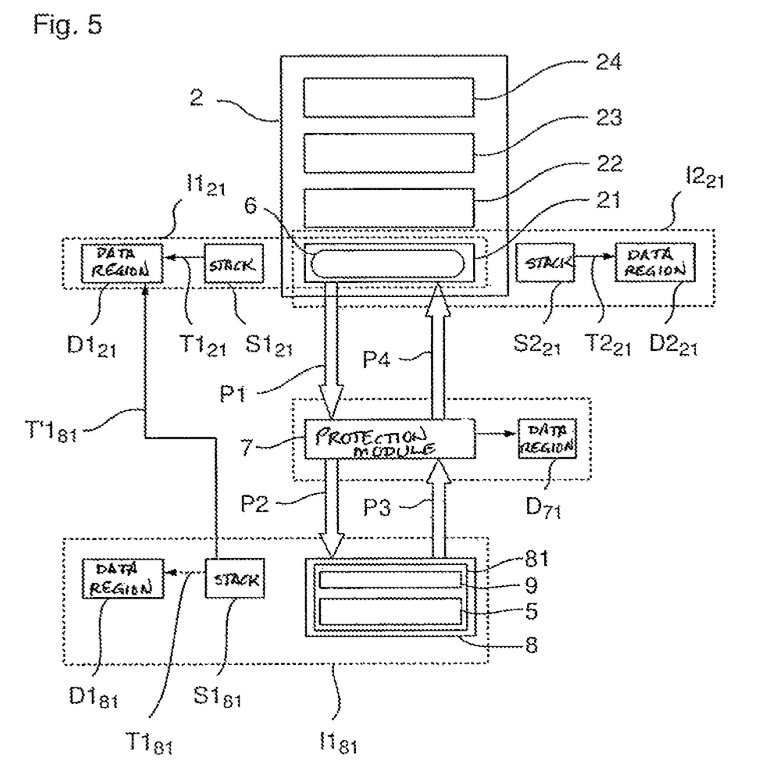
FIG. 5 schematically shows the code execution during runtime of the protected first method, and FIG. 6 schematically shows the steps carried out by the protection module of the protected application during runtime.

When the thus amended Java application 1' is executed in a virtual Java machine (Java runtime environment) several instances I121, I221 of the first method 21 of the first class 2 can exist, as schematically shown in FIG. 5.

However, the code of the respective method (in the present case the first gate code 6) is only loaded once and there is provided a separate data region D121, D221 for each instance I121, I221 as well as each method gets its private method stack S121, S221 when being invoked. The method stack S121, S221 is pointing to the assigned data region D121, D221 as indicated by arrows T121 and T221. The provisioning of the data region D121 is handled by the virtual Java machine when the first class 2 of the protected application 1' is instantiated and D221 is provisioned when the second instance of the first method 21 is created. During execution of the first method 21 the virtual Java machine provides the reference to the correct data region D121, D221 by storing a reference in the method stack of the invoked method 21. Further, during execution the code 6, the data region D121 and the method stack S121 form a first instance I121 of the method 21 and the code 6, the data region D221 and the method stack S221 form a second for instance I221.

Although the method stacks S121, S221 are shown as separate stacks, they can be generated only during runtime of the respective instance I121, I221 and can be part of the general stack used by the virtual Java machine. However, in order to simplify the description, the separate method stacks S121, S221 are described and shown in FIG. 5. The same is true for the following description of further instances of methods invoked during execution.

In case the first method 21 of the first instance I121 is called (step R1 in FIG. 6), the implanted gate code 6 is executed. The gate code 6 creates an data array including the values of all method parameters needed for executing the first method 21. In the present case the value for the parameter type of the function getcolour (type) is included in the data array. The data array further includes a unique method identifier as well as an information about the respective instance (here the first instance) of the first class 21. This data array is transmitted to the protection module 7 and the code control is transferred to the protection module 7 (arrow P1 in FIG. 5 and step R2 in FIG. 6).

Figure 6:
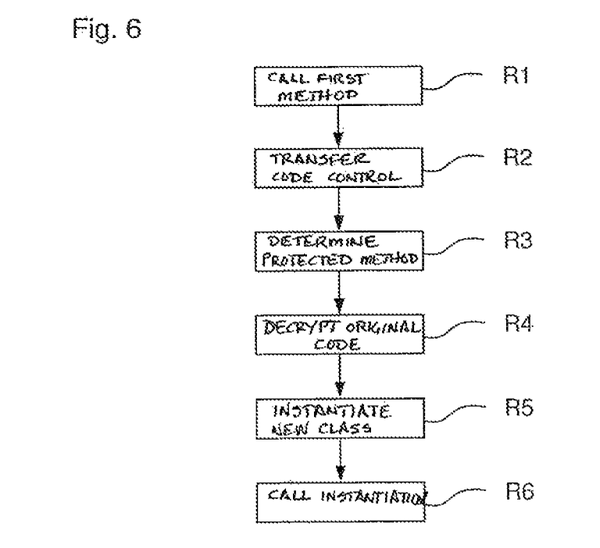

The protection module 7 determines which protected method is needed based on the method identifier and the mapping table decrypted by the protection module 7 (in this case the first method 21, step R3) and carries out a preprocessing (step R4). Since the protection module 6 only includes static methods (written in Java code 7) there is only shown code 7 and a data region D71 in FIG. 5.

In this preprocessing (step R4) the encrypted original code 5 is decrypted and a new class 8 is generated which includes only one method 81. The new method 81 comprises additional code 9 and the decrypted original code 5 (as schematically shown in FIG. 5). When generating the new class 8 code obfuscation and/or symbol obfuscation can be carried out.

An instance I181 of the new class 8 is created or instantiated by the protection module 7 (arrow P2 in FIG. 5 and step R5 in FIG. 6). This instance I181 comprises the codes 9, 5, the data region D181 and the method stack S181 pointing to the assigned data region D181 as indicated by arrow T181.

After the instantiation of the instance of the new method 81 is called (step R6) and the code execution starts with the additional code 9. The additional code 9 amends the method stack S181 such that it points to the data region D121 as indicated by arrow T'181 (the address for the so called "this instance" is amended in the method stack S181). Thereafter, the original code 5 is executed using the correct data region D121 of the first instance I121 of the first class 21. In this way, the functionality of the first method 21 is provided in the context of the first instance I121. Therefore, the new method 81 can be named substitution method 81.

After execution of the method 81, the code control returns to the protection module 7 (arrow P3) which transfers the code control back to the first gate code 6 of the first instance I121 so that the execution of the protected application 1' can be continued.

In step R3 the protection module 7 can check whether the execution of the first method 21 is authorized or licensed (if, for example, a necessary license is present). Only if the execution is authorized or the respective license is present the above described steps R3-R6 are carried out. If the execution is not authorized or the respective license is not present the steps R3 to R6 are not carried out so that the substitution method 81 is not executed. In this case it is possible that an information is displayed that the execution is not authorized or the respective license is not present and the code control is returned to the first gate code 6 of the first instance I121.

The above described steps N2 to N7 can be carried out in a repeated manner so that two or more methods of the first class 2 and/or of the other classes 3, 4 can be selectively protected. As already mentioned the respective gate code creates in step R1 the unique method identifier as part of the data array. The method identifier is used by the protection module 7 to identify the protected method which called the protection module 7.

In the above described embodiments the pointer in the respective method stack of the respective substitution method was amended in order to ensure that the substitution method uses the data region of the instance of the protected method. However, it is also possible to amend the original code in step N7 such that the substitution method directly uses the data region of the protected method.

It may be necessary to change the visibility of the class of the respective method in order to allow the access to the data region of the protected method. This can be done in step N6, for example when generating the protected application 1'. As an alternative the visibility of the class of the respective method can be dynamically changed during runtime so that the required access is possible.

In the above described embodiments the code of the method of the classes 2, 3 and 4 of the protected application, the code of the protection module 7 as well the new method of the new class generated during runtime are executed in the same Java runtime environment. However, it is possible to provide a separate runtime environment. In this case, it is preferred, that the code of the protection module 7 and the new method of the new class is executed in the separate runtime environment, which can be a proprietary runtime environment. However, it is possible that the code of the protection module 7 is executed in the Java runtime environment. Further, a part of the code of the protection module 7 can be executed in the Java runtime environment and another part of the code of protection module can be carried out in the separate runtime environment.

The separate runtime environment can be embodied such that a different code syntax or a different code is necessary. In this case the code to be executed in the separate runtime environment has to be adapted or transformed. It is preferred that the code syntax of the separate runtime environment is not publicly known.

The invention claimed is:

1. A method for selectively protecting one of a plurality of methods of a class of an application written in an object-orientated language, wherein a protected application is created by adding a protection module to the computer program, analyzing a first method to be protected of a plurality of methods of a first class of the computer program and determining first parameters needed for executing the first method, generating first gate code depending on the determined first parameters, replacing the first code of the first method by said first gate code and storing the replaced first code in a memory location accessible by said computer such that it can be accessed by the protection module during execution of the protected computer program, wherein, when the first method is called during execution of the protected computer program, the first gate code collects first data based on the determined first parameters and transmits the collected first data to the protection module, the protection module accesses the stored first code and generates a new class including a first substitution method based on the stored first code, instantiates the new class, invokes the first substitution method and passes at least a part of the collected first data to the invoked first substitution method so that the executed first substitution method provides the functionality of the first method, and returns execution to the first gate code after execution of the first substitution method, analyzing a second method to be protected of the first class or of a second class of the computer program and determining second parameters needed for execution of the second method, generating second gate code depending on the determined second parameters, replacing the second code of the second method by said second gate code and storing the replaced second code such that it can be accessed by the protection module during execution of the protected computer program, wherein, when the second method is called during execution of the protected computer program, the second gate code collects second data based on the determined second parameters and transmits the collected second data to the protection module, the protection module accesses the stored second code and generates a second new class including a second substitution method based on the stored second code, instantiates the second new class, invokes the second substitution method and passes at least a part of the collected second data to the invoked second substitution method so that the executed second substitution method provides the functionality of the second method, and returns execution to the second gate code after execution of the second substitution method.

2. The method according to claim 1, wherein the step of storing the replaced first code is carried out such that the replaced first code is stored in encrypted form.

3. The method according to claim 1, wherein a symbol obfuscation and/or a code obfuscation of the replaced first code is carried out before storing it.

4. The method according to claim 1, wherein the collected first data include a first method identifier identifying the first protected method.

5. The method according to claim 1, wherein the collected first data include an instance identifier identifying the instance of the first method called during execution, wherein a data region is assigned to said instance, and the first substitution method is generated such that the first substitution method uses the assigned data region during execution.

6. The method according to claim 5, wherein the first substitution method includes additional code which redirects the pointer of the instance of the invoked first substitution method to the assigned data region of the instance of the first method called during execution.

7. The method according to claim 1, wherein the protection module carries out code obfuscation and/or symbol obfuscation when generating the new class.

8. The method according to claim 1, wherein the first gate code and the code of the first substitution method are generated such that they can be executed in the same runtime environment.

9. The method according to claim 1, wherein the first gate code and the code of the first substitution method are generated such that they can be executed in different runtime environments.

10. The method according to claim 1, wherein the first code is amended before storing so that the executed first substitution method provides an additional functionality.

11. The method according to claim 1, wherein the step of replacing includes setting the visibility of the first class to public.

12. The method of claim 1, wherein the new class is generated such that it only contains one single method, namely the first substitution method.

\* \* \* \* \*